(12) United States Patent
Carella et al.

(10) Patent No.: US 11,370,906 B2
(45) Date of Patent: Jun. 28, 2022

(54) FLUOROPOLYMER COMPOSITION

(71) Applicant: SOLVAY SPECIALTY POLYMERS ITALY S.P.A., Bollate (IT)

(72) Inventors: Serena Carella, Parabiago Milan (IT); Giambattista Besana, Mariano Comense (IT); Suneel Bandi, Voorhees, NJ (US); Bradley Lane Kent, Woolwich Township, NJ (US)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 14/892,942

(22) PCT Filed: May 19, 2014

(86) PCT No.: PCT/EP2014/060177
§ 371 (c)(1),
(2) Date: Nov. 20, 2015

(87) PCT Pub. No.: WO2014/187758
PCT Pub. Date: Nov. 27, 2014

(65) Prior Publication Data
US 2016/0102199 A1    Apr. 14, 2016

Related U.S. Application Data

(60) Provisional application No. 61/825,906, filed on May 21, 2013.

(51) Int. Cl.
| | | |
|---|---|---|
| *C08L 27/12* | (2006.01) | |
| *C08L 23/08* | (2006.01) | |
| *C08K 5/526* | (2006.01) | |
| *C08L 33/02* | (2006.01) | |

(52) U.S. Cl.
CPC ........... *C08L 27/12* (2013.01); *C08K 5/526* (2013.01); *C08L 23/0892* (2013.01); *C08L 33/02* (2013.01); *C08L 2201/08* (2013.01)

(58) Field of Classification Search
CPC .. C08L 27/12; C08L 23/0892; C08L 2201/08; C08L 33/02; C08K 5/526
USPC .......................................................... 524/151
See application file for complete search history.

(56) References Cited

U.S. PATENT DOCUMENTS

| | | | |
|---|---|---|---|
| 5,328,948 A | 7/1994 | Chen et al. | |
| 5,614,319 A * | 3/1997 | Wessels | ............... C08L 23/0892 174/110 F |
| 7,985,790 B2 * | 7/2011 | Polastri | .................... C08K 5/04 106/14.13 |

FOREIGN PATENT DOCUMENTS

| | | |
|---|---|---|
| EP | 69195 A2 | 1/1983 |
| EP | 683204 A2 | 11/1995 |

OTHER PUBLICATIONS

"Mark 260," Plastics Additives Database, William Andrew Publishing/Plastics Design Library (2004).*
"Carbosperse™ K-766 Sodium Polymethacrylate," technical data sheet, Lubrizol (2007).*
"Rhodoline™ 270," Handbook of Industrial Surfactants, 4th Ed., p. 2071, Synapse Information Resources. (Year: 2008).*

* cited by examiner

*Primary Examiner* — Josephine L Chang
(74) *Attorney, Agent, or Firm* — Osha Bergman Watanabe & Burton LLP

(57) ABSTRACT

The invention pertains to a fluoropolymer composition comprising: —at least one polymer comprising recurring units derived from ethylene (E) and from chlorotrifluoroethylene (CTFE) [ECTFE polymer]; —at least one water-soluble polyelectrolyte [polyelectrolyte (E)]; and—at least one antioxidant compound [compound (P)], said composition having improved thermal resistance.

19 Claims, 1 Drawing Sheet

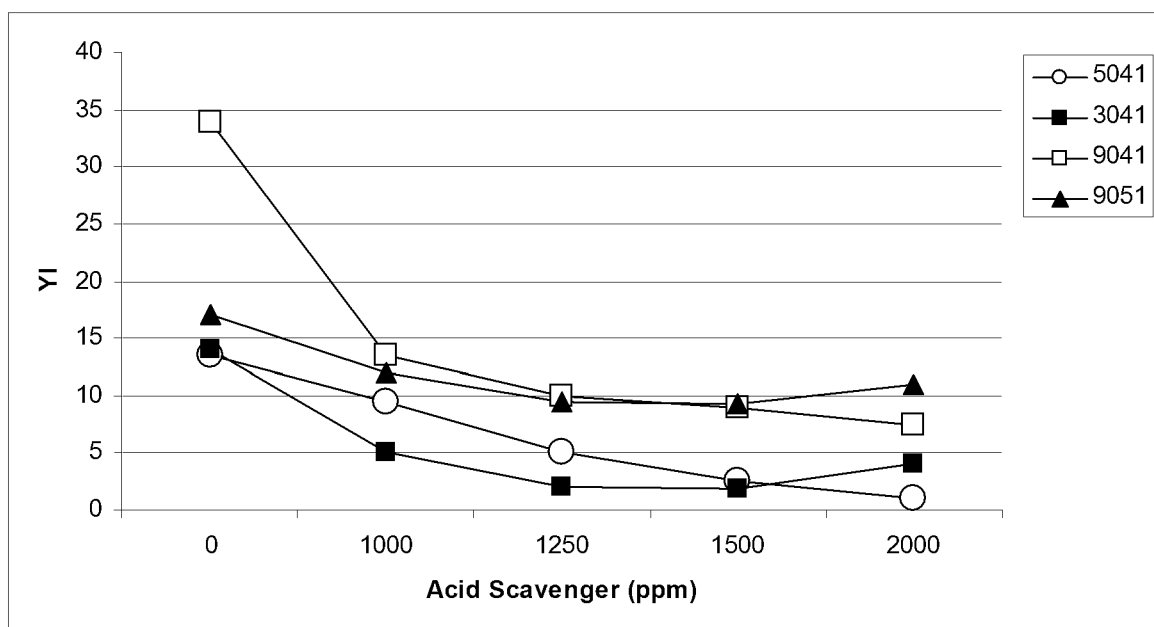

FLUOROPOLYMER COMPOSITION

CROSS-REFERENCE TO RELATED APPLICATION

This application is a U.S. national stage entry under 35 U.S.C. § 371 of International Application No. PCT/EP2014/060177 filed May 19, 2014, which claims priority to U.S. provisional application No. 61/825,906, filed May 21, 2013. The entire contents of these applications are explicitly incorporated herein by this reference.

TECHNICAL FIELD

The invention pertains to a fluoropolymer composition comprising a copolymer of ethylene with chlorotrifluoroethylene and certain polyelectrolytes, said composition having improved thermal resistance.

BACKGROUND ART

Alternating copolymers of ethylene and chlorotrifluoroethylene (ECTFE) are thermoplastic materials with melting points in the range of 180-250° C., which are thus generally processed at temperatures of 220-320° C.

Exposure to harsh thermal conditions, especially for prolonged durations, might lead to thermal decomposition of ECTFE.

It is generally understood that the mechanism of decomposition involves both radical generation and direct dehydrohalogenation, both of which might finally generate HF, HCl and create ethylenically unsaturated moiety in the polymer chain. Further, oxidative degradation of ECTFE is recognized to lead to chain scissions and generate volatile chain fragments. While acids and volatile formation might be responsible for corrosion of surrounding parts and generate bubbles and defects, unsaturations could be responsible of crosslinking of the polymer, dramatically modifying final properties. As a whole, the result of thermal instability leads to poor processability, yellow to brownish color in pellets and bubbles and gels in film and sheet.

To address the thermal instability of ECTFE, and more particularly of grades intended to be processed in the molten state, stabilizers are added to the materials before they are extruded and pelletized.

A stabilizer package for ECTFE typically contains a combination of an antioxidant and of an acid scavenger.

Thus, U.S. Pat. No. 5,328,948 (AUSIMONT, USA, INC.) Dec. 7, 1994 pertains to the stabilization of ethylene/chlorotrifluoroethylene copolymers using a combination of an effective amount of an ionomer, and of an antioxidant selected from notably phosphate derivatives, including e.g. phosphate ester derivatives of polyhydric phenols. As ionomers, an ethylene-acrylic acid copolymer metal salt, notably commercially available from Allied-Signal as Aclyn® grade, or styrene/sulfonated styrene copolymer in its salified form were employed in preferred embodiments.

While the solutions described in U.S. Pat. No. 5,328,948 (AUSIMONT, USA, INC.) Dec. 7, 1994 have been proven to be effective, a continuous need is felt for consistently improve thermal resistance and processing performances of ECTFE materials.

Further, in addition, ionomers taught in U.S. Pat. No. 5,328,948 (AUSIMONT, USA, INC.) Dec. 7, 1994 are relatively expensive materials, which, in addition, while possibly dispersible in water, are nevertheless not soluble in aqueous media. Actually ionomers are charged polymers possessing along their backbones only a low density pf charged units, with the fraction of these units typically less than about 15% on a mole basis; the remaining units are non-polar and water-insoluble, and so ionomers do not dissolve in high dielectric constant solvents, including water. This last property is actually a serious drawback for efficient incorporation and dispersion into ECTFE matrix of the ionomer via wet-mixing processes, which are well established techniques for compounding stabilizers in ECTFE polymers.

In such wet-mixing processes, blending of ECTFE powder with an aqueous dispersion of the ionomer is achieved in a blender at temperatures of 80 to 90° C.; after cooling and separation from the aqueous mother liquor, mixed powder is then conveyed e.g. to extruders for further processing. Because of the water-insoluble nature of the ionomers, achieving throughout dispersion of the ionomer into the ECTFE powder requires long mixing times and high temperatures; despite applying these precautions, uneven distribution and/or other problems might still occur, thus causing quality issues in further processing steps.

SUMMARY OF INVENTION

The Applicant has now found a new stabilizer package able to ensure adequate thermal stabilization, and which provides a solution to all above mentioned drawbacks and problems.

The invention thus pertains to a fluoropolymer composition comprising:
- at least one polymer comprising recurring units derived from ethylene (E) and from chlorotrifluoroethylene (CTFE) [ECTFE polymer];
- at least one water-soluble polyelectrolyte [polyelectrolyte (E)]; and
- at least one antioxidant compound [compound (P)].

The Applicant has surprisingly found that the fluoropolymer composition, as above detailed, possesses improved color (improved whiteness, less discoloration) when melt processed at high temperatures (e.g. from about 220-320° C.) thanks to the combined effect of the compound (P) and the polyelectrolyte (E). Further, overall cost of stabilizing package can be significantly reduced by replacement of more expensive ionomers with cheaper polyelectrolytes (E). Finally, because of the water-soluble character of the polyelectrolyte (E), dispersability of this component in the ECTFE polymer is facilitated, in particular when compounded via wet-processes.

BRIEF DESCRIPTION OF DRAWINGS

FIG. 1 is a graph showing the Yellow Index (YI) as a function of the amount of polyelectrolyte used in fluoropolymer compositions made of an ECTFE polymer and containing 3000 ppm of a phosphite compound.

DESCRIPTION OF EMBODIMENTS

The ECTFE polymer of the composition of the invention typically comprise:
(a) from 10 to 90%, preferably from 30 to 70%, more preferably from 40 to 60% by moles of recurring units derived from ethylene (E);
(b) from 90 to 10%, preferably from 70 to 30%, more preferably from 40 to 60% by moles of recurring unites derived from chlorotrifluoroethylene (CTFE), based on the total moles of the recurring units of the ECTFE polymer; and (c) optionally, from 0 to 30%, preferably from 0.1 to 15% by moles, based on the total amount of monomers (a) and (b), of recurring units derived from one or more fluorinated and/or hydrogenated comonomer(s).

Non limiting examples of fluorinated comonomers are for instance perfluoroalkylvinylethers, perfluoroalkylethylenes (such as perfluorobutylethylene), perfluorodioxoles, vinylidenefluoride. Among them, the preferred comonomer is perfluoropropylvinylether of formula $CF_2=CFO-C_3F_7$.

Non limiting examples of hydrogenated comonomers, are those having the general formula: $CH_2=CH-(CH_2)_nR_1$ wherein $R_1=OR_2$, or $-(O)_tCO(O)_pR_2$ wherein t and p are integers equal to 0 or 1 and $R_2$ is H or a hydrogenated linear or branched alkyl or cycloalkyl radical having from 1 to 20 carbon atoms, optionally containing heteroatoms and/or chlorine atoms, the heteroatoms preferably being O or N; $R_2$ optionally contains one or more functional groups, preferably selected from OH, COOH, epoxide, ester and ether, $R_2$ may optionally contain double bonds; n is an integer in the range 0-10. Preferably $R_2$ is an alkyl radical having from 1 to 10 carbon atoms containing hydroxyl functional groups and n is an integer in the range 0-5.

Preferred hydrogenated comonomers are selected from the following classes:
  acrylic monomers having the general formula: $CH_2=CH-CO-O-R_2$, wherein $R_2$ is selected from ethylacrylate, n-butylacrylate, acrylic acid, hydroxyalkylacrylates, such as hydroxyethylacrylate, hydroxypropylacrylate, (hydroxy)ethylhexylacrylate;
  vinylether monomers having the general formula: $CH_2=CH-O-R_2$, wherein $R_2$ is selected from propylvinylether, cyclohexylvinylether, vinyl-4-hydroxybutylether;
  vinyl monomers of the carboxylic acid having the general formula: $CH_2=CH-O-CO-R_2$, wherein $R_2$ is selected from vinyl acetate, vinyl propionate, vinyl-2-ethylhexanoate;
  unsaturated carboxylic acid monomers having the general formula: $CH_2=CH-(CH_2)_n-COOH$, wherein n has the above mentioned meaning, for instance vinylacetic acid.

Preferably the comonomer (c) is a hydrogenated comonomer selected from the group of the acrylic monomers as above defined. More preferably the hydrogenated comonomer is selected from the group of the hydroxyalkylacrylate comonomers, such as hydroxyethylacrylate, hydroxypropylacrylate and (hydroxy)ethylhexylacrylate.

Nevertheless, ECTFE polymers, as above detailed, free from comonomers (c) will be preferred.

The melt flow rate of the ECTFE polymer, measured following the procedure of ASTM 3275-81 at 230° C. and 2.16 Kg, ranges generally from 0.01 to 75 g/10 min, preferably from 0.1 to 50 g/10 min, more preferably from 0.5 to 30 g/10 min.

According to a first embodiment of the invention, the ECTFE polymers typically possess a melting temperature exceeding 220° C., preferably exceeding 225° C., even exceeding 230° C., preferably exceeding 235° C. The melting temperature is determined by Differential Scanning calorimetry (DSC) at a heating rate of 10° C./min, according to ASTM D 3418.

ECTFE polymers of this embodiment which have been found to give particularly good results in the composition of the invention are those consisting essentially of:

(a) from 40 to 60%, preferably from 45 to 55%, more preferably from 48 to 53% by moles of recurring units derived from ethylene (E);
(b) from 60 to 40%, preferably from 55 to 45%, more preferably from 52 to 47% by moles of recurring units derived from chlorotrifluoroethylene (CTFE),
based on the total moles of the recurring units of the ECTFE polymer.

End chains, defects or minor amounts of monomer impurities leading to recurring units different from those above mentioned can be still comprised in the preferred ECTFE, without affecting properties of the material.

An ECTFE polymers consisting essentially of about 50% moles of recurring units derived from ethylene and of about 50% moles of recurring units derived from chlorotrifluoroethylene has been found particularly adapted to the hereby claimed composition.

According to another embodiment, ECTFE polymers typically possessing a melting temperature not exceeding 210° C., preferably not exceeding 200° C., even not exceeding 198° C., preferably not exceeding 195° C., more preferably not exceeding 193° C., even more preferably not exceeding 190° C., when measured by Differential Scanning calorimetry (DSC) at a heating rate of 10° C./min, according to ASTM D 3418, can be used.

The ECTFE polymer of this second embodiment has a melting temperature of advantageously at least 120° C., preferably of at least 130° C., still preferably of at least 140° C., more preferably of at least 145° C., even more preferably of at least 150° C.

ECTFE polymers which have been found to give particularly good results within this second embodiment are those consisting essentially of:
(a) from 35 to 47% by moles of recurring units derived from ethylene (E);
(b) from 53 to 65% by moles of recurring units derived from chlorotrifluoroethylene (CTFE).

End chains, defects or minor amounts of monomer impurities leading to recurring units different from those above mentioned can be still comprised in the preferred ECTFE, without this affecting properties of the material.

The fluoropolymer composition of the invention typically comprises the ECTFE polymer(s) in combination with an effective stabilizing amount of polyelectrolyte (E) and compound (P).

The amount of ECTFE polymer in the invention composition is thus generally of at least 50% wt, preferably at least 80% wt, more preferably at least 90% wt, with respect to the total weight of the composition.

Other ingredients, including pigments, reinforcing fillers, processing aids, can be nevertheless be incorporated in the fluoropolymer composition of the invention.

Preferred fluoropolymer compositions of the invention are nevertheless those essentially consisting of the ECTFE polymer, as above detailed, polyelectrolyte (E) and compound (P).

The polyelectrolyte (E) used in the composition of the present invention is a polymer consisting essentially of recurring units including at least one ionizable group.

Because of the presence of an ionizable group in substantially each of the recurring units, the polyelectrolyte (E) is notably able to develop a substantial charge when dissolved in a highly polar solvent like water.

The polyelectrolyte (E) used in the composition of the present invention is water-soluble. Within the frame of the present invention, the expression "water-soluble" in combination with the polyelectrolyte (E) is to be understood to mean that the polyelectrolyte has solubility in water at 25° C. of at least 1 g/l, preferably of at least 5 g/l, more preferably of at least 10 g/l.

The ionisable group of the recurring units of the polyelectrolyte (E) can be a cationic group (i.e. a group leading in ionised form to a positive charge in the recurring unit) or an anionic group (i.e. a group leading in ionised form to a negative charge in the recurring unit).

Cationic-type polyelectrolytes (E) typically consist essentially of recurring units having at least one ionisable group selected from the group consisting of amine groups and imine groups.

Non limitative examples of cationic-type polyelectrolytes (E) include notably poly(ethyleneimine)s, polyvinylpyridines, poly(lysine)s, poly(dimethylaminoethyl acrylate)s.

Anionic-type polyelectrolytes (E) typically consist essentially of recurring units having at least one ionisable group selected from the group consisting of carboxylic acid (—COOH), sulfonic acid (—SO$_3$H) and phosphonic acid (—PO$_3$H$_2$) groups.

Non limitative examples of anionic-type polyelectrolyte (E) include notably poly(meth)acrylic acids, poly(styrene sulfonic acid)s, poly(glutamic acid)s, poly(vinylsulfate)s.

Without being bond by this theory, the Applicant is of the opinion that the polyelectrolyte (E) is notably effective in capturing acids like HCl and HF which might be formed during ECTFE degradation processes and thus significantly contributes avoiding further propagation and detrimental effects related to initial formation of said acidic compounds.

The choice of the polyelectrolyte (E) is not particularly limited, provided that it advantageously notably ensures appropriate acid scavenger capabilities.

Typically, cationic-type polyelectrolytes (E) will be used in the composition of the invention in their "neutral" form, while anionic-type polyelectrolytes (E) will be used in the composition of the invention in their salified form.

Polyelectrolytes (E) which have been found particularly effective in the composition of the present invention are anionic-type polyelectrolytes (E), and more precisely, metal or ammonium salts of anionic-type polyelectrolytes (E).

The composition of the invention will thus preferably comprise at least one polyelectrolyte (E) selected from the group consisting of poly(meth)acrylic acid metal or ammonium salts.

The preferred polyelectrolyte (E) generally complies with formula:

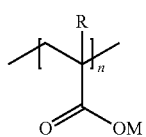

with M being an ammonium group or an alkaline metal cation (preferably Na$^+$), R being H or —CH$_3$, and n being an integer such that the number-averaged molecular weight of the polyelectrolyte is of from 1 000 to 10 000, preferably of 2 000 to 8 000, more preferably of 3 000 to 5 000.

Examples of polyelectrolytes (E) which have been successfully used within the frame of the present invention are:
  a polyacrylic acid sodium salt having molecular weight of about 3500, commercially available as RHODOLINE® 270;
  a polymethacrylic acid sodium salt having molecular weight of about 5000, commercially available as CARBOSPERSE® K 766.

The polyelectrolyte (E) is used in the fluoropolymer composition of the invention in an amount effective to achieve stabilization. The skilled in the art will be able to select adequate concentrations by routine experiences, aiming at optimizing performances/cost balance. The polyelectrolyte (E) will be thus generally used in an amount of at least 500 ppm, preferably 750 ppm, with respect to the weight of ECTFE polymer.

Upper amount is not critical, but will be reasonably limited for economic reasons and for not impacting overall properties of the fluoropolymer composition. Generally amounts of less than 20000 ppm, for example less than 10000 ppm will be used, preferably of less than 8000 ppm, more preferably of less than 5000 ppm, with respect to the weight of ECTFE polymer.

Best results have been obtained when using an amount of polyelectrolyte of from 1000 ppm to 3000 ppm, with respect to the weight of ECTFE polymer, more specifically of about 1250 ppm.

The polyelectrolytes (E) are thus generally used in amounts similar to those taught in U.S. Pat. No. 5,328,948 (AUSIMONT, USA, INC.) Dec. 7, 1994 for ionomers; because the price of polyelectrolytes is generally well below that of ionomers, this might provide a significant gain in the economics of the stabilizing package. As an example, ACLYN® ionomer, as mentioned in U.S. Pat. No. 5,328,948 (AUSIMONT, USA, INC.) Dec. 7, 1994 is available at a price which is about 6 times higher than the price of CARBOSPERSE® K 766: using this latter in the stabilizing package instead of the ionomer would thus provide for a cost reduction of about 80% with regards to this component.

The fluoropolymer composition of the invention comprises at least one antioxidant compound [compound (P)], which is preferably selected from the group consisting of phosphite derivatives, hindered phenols derivatives, hindered amine derivatives and thioester compounds.

Compounds (P) which are preferred for their effectiveness at low load in the fluoropolymer composition of the invention are in particular phosphite derivatives, especially phosphite derivatives including at least one esterified phenol-type group, and more specifically alkyl-phosphite mixed esters derived from esterification of polyhydric phenol compounds.

Compounds (P) of this type which are particularly recommended in combination with the polyelectrolyte (E) in the composition of the invention are specifically compounds of formula:

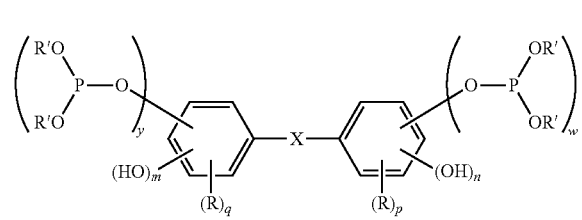

wherein:
  X is a bond or a divalent group possibly selected from the group consisting of: —O—, —S—, —C(O)—, —SO$_2$—, —(CR$^1$R$^2$)$_k$—, with k being an integer of 1 to 6, preferably 1, and R$^1$ and R$^2$, equal to or different from each other, are H or an alkyl group, optionally fluorinated, preferably —CH$_3$, —CF$_3$, —C$_2$H$_5$, —C$_3$H$_7$, each of R is independently a $C_1$-$C_{18}$ hydrocarbon group, possibly comprising heteroatoms, preferably a $C_1$-$C_{18}$ alkyl group;

each of m, n, p, q is independently zero or an integer of from 1 to 3, preferably zero;

each of w and y is independently an integer of 1 to 3, preferably 1;

each of R' is independently a $C_1$-$C_{18}$ alkyl group.

Compounds (P) which have been found particularly effective in the composition of the invention are:

long chain alkyl-bisphenol A bis-phosphites, and in particular compound (P) of formula:

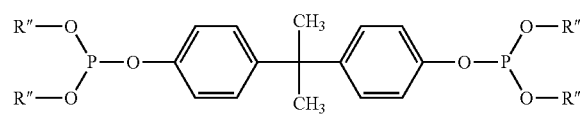

with R being a $C_{12\text{-}15}H_{25\text{-}31}$ alkyl group, commercially available under trade name DOVERPHOS® 613 from Dover Chemical Corporation; and long chain alkyl-substituted diphenol bis-phosphites, and in particular compound (P) of formula:

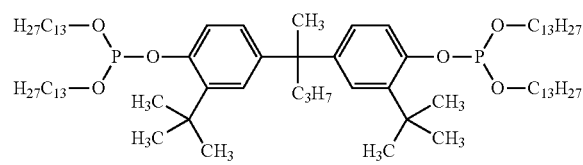

commercially available under trade name ADK STAB 260 from Adeka Corporation.

From the standpoint of color and cost, combining polyelectrolyte (E) with DOVERPHOS® 613 phosphite compound, as above detailed, is the most valuable solution.

The compound (P) is used in the fluoropolymer composition of the invention in an amount effective to achieve stabilization. The skilled in the art will be able to select adequate concentrations by routine experiences, aiming at optimizing performances/cost balance. The compound (P) will be thus generally used in an amount of at least 100 ppm, preferably 500 ppm, with respect to the weight of ECTFE polymer.

Upper amount of compound (P) is not critical, but will be reasonably limited for economic reasons and for not impacting overall properties of the fluoropolymer composition. Generally amounts of less than 20000 ppm will be used, preferably of less than 10000 ppm, more preferably of less than 8000 ppm, with respect to the weight of ECTFE polymer.

Best results have been obtained when using an amount of compound (P) of 1000 ppm to 8000 ppm, with respect to the weight of ECTFE polymer, and more specifically an amount of about 3000 ppm.

The invention further pertains to a process for manufacturing the fluoropolymer composition as above described, said process comprising mixing the ECTFE polymer, the polyelectrolyte (E) and the compound (P).

The ECTFE polymer is generally provided in the process of the invention under the form of a powder. This expression has to be understood as possessing the usual meaning, i.e. under the form of loose discrete particles of material.

The powder generally has an average particle size of 0.1 to 1000 μm, preferably of 0.2 to 500 μm.

According to a preferred embodiment of the invention, the process comprises:

solubilizing the polyelectrolyte (E) in water, so as to obtain an aqueous solution; and wet-mixing the ECTFE polymer with the aqueous solution of polyelectrolyte (E).

The aqueous solution of polyelectrolyte (E) generally is prepared at room temperature; a concentration of at least 1% wt, preferably 5% wt of polyelectrolyte (E) in solution is generally preferred. Concentration is generally limited for optimizing viscosity, and thus workability of said aqueous solutions. Concentrations of less than 30% wt, preferably less than 20% wt are thus preferred. Best results have been obtained with concentration of polyelectrolyte (E) of 8 to 15% wt, and more particularly of about 10% wt.

Within this embodiment, incorporation of compound (P) is not critical; the process of this embodiment can thus comprises, according to a variant, a step of dry-mixing the ECTFE polymer with the compound (P) prior to wet-mixing. Alternatively, the compound (P) can be added during wet-mixing, as above detailed.

At the end of the process, the composition is generally further processed in the molten state in extrusion devices, e.g. so as to be delivered under the form of pellets, for further processing.

The composition of the invention is particularly suitable for being used for manufacturing films, sheets, pipes, tubes or other finished articles.

For obtaining such finished articles, the composition of the invention is generally processed in the molten state according to conventional techniques including extrusion molding, injection molding, rotomolding, and the like.

Should the disclosure of any patents, patent applications, and publications which are incorporated herein by reference conflict with the description of the present application to the extent that it may render a term unclear, the present description shall take precedence.

The invention will now be described with reference to the following examples, whose purpose is merely illustrative and not intended to limit the scope of the present invention.

EXAMPLES

Raw Materials

The following ECTFE polymers were used:

HALAR® 5041 ECTFE polymer, 50/50 molar ratio E/CTFE with melt flow rate of 15-22 g/10 min, at 275° C. under a piston load of 2.16Kg;

HALAR® 3041 ECTFE polymer, 50/50 molar ratio E/CTFE with melt flow rate of 1.5-3.0 g/10 min, at 275° C. under a piston load of 2.16Kg HALAR® 9041 ECTFE polymer, 50/50 molar ratio E/CTFE with melt flow rate of 0.8-1.3 g/10 min, at 275° C. under a piston load of 2.16Kg HALAR® 9051 ECTFE polymer, about 47/53 molar ratio E/CTFE with melt flow rate of 0.8-1.3 g/10 min, at 275° C. under a piston load of 5 Kg all commercially available from Solvay Specialty Polymers.

The following polyelectrolytes (E) were used:

RHODOLINE® 270 water soluble sodium polyacrylic acid salt, having $M_w$=3500 [polyelectrolyte (E1), hereinafter];

CARBOSPERSE® K766 water soluble sodium polymethacrylic acid salt, having $M_w$=5000 [polyelectrolyte (E2), hereinafter].

The polyelectrolytes (E1) and (E2) were solubilised in water for providing a 10% wt aqueous solution.

SEASTAB® 705 available from Mitsui Plastics, Inc. is a white powder with an average particle size of about 2.77 microns, a specific gravity of about 2.2, a refractive index of about 1.54 to 1.57, a hardness (Mohs') of about 12.3 to 12.4, a beginning temperature of dehydration of about 200° C., a moisture content of about 1 percent at 120° C., 1H and a BET surface area of about 23 $m^2/g$, which comprises (Ca, Mg, Al)(OH)$_2$ and SiO$_2$ with 40.06 weight percent CaO, 14.05 weight percent MgO, 8.54 weight percent Al$_2$O$_3$, and 2.35 weight percent SiO$_2$.

The following compounds (P) were used:
DOVERPHOS® 613 Alkyl ($C_{12-15}$) bis-phenol A bis-phosphite, having a phosphorous content of 5.4% and an average molar mass of 1028 [compound (P1), hereinafter];
ADK STAB 260 Alkyl ($C_{13}$) phosphite derivative, having a phosphorous content of 4.7% and a molar mass of 1238 [compound (P2), hereinafter].

General Procedure for Preparing Compositions

The required amounts of compound (P) and of the solution of polyelectrolyte (E) were directly mixed with dry neat powder of ECTFE polymer in a ribbon blender. The wet mixture so obtained was stirred for 45 minutes to 60 minutes at about 100° C., during which evaporation of water occurred, followed by slowly cooling under stirring for about additional 45 minutes. When blender temperature achieved less than 50° C., the dry mixture was recovered and further processed by extrusion for obtaining pellets. Melt temperature range used in extruder were in the range of 470 to 600° F., corresponding to 240-315° C., with a melt pressure range of 1100-2900 psig (about 75-200 bar).

Color Properties of the Compositions

Several compositions comprising the ECTFE polymer grades 5041, 3041, 9041 and 9051, as above detailed, in combination with 3000 ppm of compound (P1) and variable amounts of polyelectrolyte (E2) were tested for their color rating according to ASTM E313 method, using a Hunterlab-Colorflex45 instrument.

The table herein below summarize data obtained, which are also graphically provided in FIG. 1.

TABLE 1

| Yellow Index | Amount of polyelectrolyte (E2) | | | | |
|---|---|---|---|---|---|
| | 0 (control) | 1000 ppm | 1250 ppm | 1500 ppm | 2000 ppm |
| ECTFE polymer grade 5041 | | | | | |
| 5041 | 13.5 | 9.5 | 5.0 | 2.5 | 1.0 |
| ECTFE polymer grade 3041 | | | | | |
| 3041 | 14 | 5.0 | 2.0 | 1.8 | 4.0 |
| ECTFE polymer grade 9041 | | | | | |
| 9041 | 34 | 13.5 | 10.0 | 9.0 | 7.5 |
| ECTFE polymer grade 9051 | | | | | |
| 9051 | 17 | 12 | 9.5 | 9.3 | 11 |

Acid Release at 300° C.

For determining thermal stability against decomposition, and in particular against release of HCl, a set of two samples of pelletized compositions was introduced in a Hastelloy sample received in an oven. The oven was heated at 300° C. for 120° C., so as to simulate harsh conditions possibly encountered during processing. During this thermal treatment, a nitrogen flow was continuously flushed through the oven and bubbled in an aqueous solution for scrubbing and capturing evolved HCl. The aqueous solution collected after 120 minutes at 300° C. was submitted to ion chromatography for determining Chloride anion content. Results obtained with a composition (A) based on ECTFE polymer grade 5041 stabilized with 3000 ppm of compound (P1) and 1000 ppm of polyelectrolyte (E2) are summarized below, and compared with results obtained in similar conditions with an analogous composition (B), comprising same ingredients but wherein 1000 ppm of SEASTAB® 705 inorganic acid scavenger were used instead of polyelectrolyte (E2).

TABLE 2

| | Composition (A) | | Composition (B) | |
|---|---|---|---|---|
| | 1 | 2 | 1 | 2 |
| Cl released (μg/g) | 396 | 333 | 1336 | 1166 |

Results above detailed well demonstrate particular effectiveness of the combination of compound (P) and polyelectrolyte (E) in preventing thermal induced degradation of the ECTFE polymer leading to release of HCl.

The invention claimed is:

1. A fluoropolymer composition comprising:
   at least one polymer comprising recurring units derived from ethylene and from chlorotrifluoroethylene [ECTFE polymer];
   from 500 ppm to less than 10000 ppm of at least one water-soluble polyelectrolyte (E), wherein polyelectrolyte (E) is a polymer having a solubility in water at 25° C. of at least 1 g/l and consisting of recurring units including at least one ionizable group in each of the recurring units; and
   from 100 ppm to less than 20000 ppm of at least one antioxidant compound (P), wherein antioxidant compound (P) is at least one antioxidant compound selected from the group consisting of phosphite derivatives, hindered phenol derivatives, hindered amine derivatives and thioester compounds.

2. The fluoropolymer composition of claim 1, wherein the ECTFE polymer of the composition of the invention comprises:
   (a) from 10 to 90% by moles of recurring units derived from ethylene, based on the total moles of the recurring units of the ECTFE polymer;
   (b) from 90 to 10% by moles of recurring unites derived from chlorotrifluoroethylene, based on the total moles of the recurring units of the ECTFE polymer; and
   (c) optionally, from 0 to 30% based on the total amount of monomers (a) and (b), of recurring units derived from one or more fluorinated and/or hydrogenated comonomer(s).

3. The composition of claim 2, wherein the ECTFE polymer consists essentially of:
   (a) from 40 to 60% by moles of recurring units derived from ethylene;
   (b) from 60 to 40% by moles of recurring units derived from chlorotrifluoroethylene, based on the total moles of the recurring units of the ECTFE polymer.

4. The composition according to claim 3, wherein the ECTFE polymer consists essentially of:
(a) from 48 to 52% by moles of recurring units derived from ethylene;
(b) from 52 to 48% by moles of recurring units derived from chlorotrifluoroethylene, based on the total moles of the recurring units of the ECTFE polymer.

5. The composition according to claim 1, comprising the polyelectrolyte (E) in an amount of at least 750 ppm to less than 10000 ppm, with respect to the weight of ECTFE polymer.

6. The composition according to claim 5, comprising the polyelectrolyte (E) in an amount of at least 750 ppm and in an amount of less than 5000 ppm, with respect to the weight of ECTFE polymer.

7. The composition according to claim 1, comprising the polyelectrolyte (E) in an amount of from 500 ppm to less than 8000 ppm, with respect to the weight of ECTFE polymer.

8. The composition according to claim 1, wherein polyelectrolyte (E) is an anionic-type polyelectrolyte (E) consisting of recurring units having at least one ionizable group selected from the group consisting of carboxylic acid (—COOH), sulfonic acid (—SO$_3$H) and phosphonic acid (—PO$_3$H$_2$) groups.

9. The composition according to claim 1, wherein the polyelectrolyte (E) is a polymer of formula:

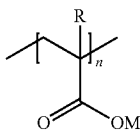

wherein M is an ammonium group or an alkaline metal cation, R is H or —CH$_3$, and n is an integer such that the number-averaged molecular weight of the polyelectrolyte is of from 1,000 to 10,000.

10. The composition according to claim 9, wherein M is Na$^+$ and n is an integer such that the number-averaged molecular weight of the polyelectrolyte is of from 3,000 to 5,000.

11. The composition according to claim 1, comprising compound (P) in an amount of at least 500 ppm to less than 20000 ppm, with respect to the weight of ECTFE polymer.

12. The composition according to claim 11, comprising compound (P) in an amount of at least 500 ppm and in an amount of less than 8000 ppm, with respect to the weight of ECTFE polymer.

13. The composition according to claim 1, wherein compound (P) is a compound of formula:

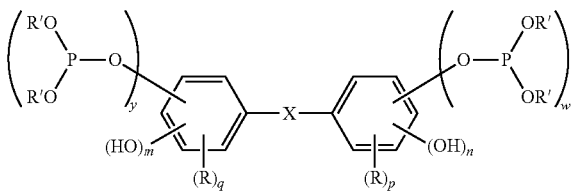

wherein:
X is a bond or a divalent group selected from the group consisting of:
—O—, —S—, —C(O)—, —SO$_2$—, —(CR$^1$R$^2$)$_k$— wherein k is an integer of 1 to 6, and R$^1$ and R$^2$ equal to or different from each other, are H or an alkyl group, optionally fluorinated, each of R is independently a C$_1$-C$_{18}$ hydrocarbon group, optionally comprising one or more heteroatoms;

each of m, n, p, q is independently zero or an integer of from 1 to 3;

each of w and y is independently an integer of 1 to 3;

each of R' is independently a C$_1$-C$_{18}$ alkyl group.

14. The composition according to claim 13, wherein compound (P) is a compound of formula:

k is 1; R$^1$ and R$^2$, equal to or different from each other, are selected from H, —CH$_3$, —CF$_3$, —C$_2$H$_5$, and —C$_3$H$_5$; each of R is independently a C$_1$-C$_{18}$ alkyl group; each of m, n, p, q is zero; and each of w and y is 1.

15. The composition according to claim 1, wherein compound (P) is selected from:

long chain alkyl-bisphenol A bis-phosphite of formula:

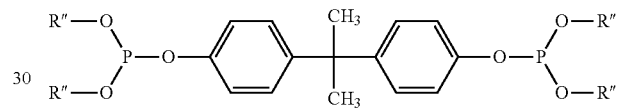

wherein R is a C$_{12-15}$H$_{25-31}$ alkyl group; and long chain alkyl-substituted diphenol bis-phosphite of formula:

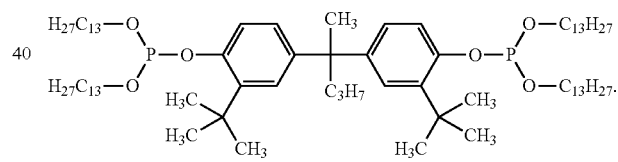

16. The composition according to claim 1, wherein the fluoropolymer composition is melt processable.

17. A process for manufacturing the composition according to claim 1, said process comprising mixing the ECTFE polymer, the polyelectrolyte (E) and the compound (P).

18. The process of claim 17, said process comprising:
solubilizing the polyelectrolyte (E) in water, so as to obtain an aqueous solution; and
wet-mixing the ECTFE polymer with the aqueous solution of polyelectrolyte (E).

19. The process of claim 17, further comprising processing the composition in the molten state in at least one extrusion device.

* * * * *